United States Patent [19]

Sato et al.

[11] Patent Number: 5,124,970
[45] Date of Patent: Jun. 23, 1992

[54] OPTICAL HEAD HAVING A PRISM

[75] Inventors: Katsuharu Sato; Naoharu Yanagawa, both of Saitama, Japan

[73] Assignee: Pioneer Electronic Corporation, Tokyo, Japan

[21] Appl. No.: 465,869

[22] Filed: Jan. 16, 1990

[30] Foreign Application Priority Data

Jul. 19, 1989 [JP] Japan .................................. 1-184518

[51] Int. Cl.$^5$ .............................................. G11B 7/00
[52] U.S. Cl. .................................. 369/112; 369/44.14
[58] Field of Search .................. 250/201.5; 369/44.14, 369/44.32, 112, 44.23

[56] References Cited

U.S. PATENT DOCUMENTS 4,406,520 9/1983 Sato ..................... 369/44.23 X

FOREIGN PATENT DOCUMENTS

| 107461 | 5/1984 | European Pat. Off. |
| 63-58316 | 4/1988 | Japan . |
| 1412939 | 11/1975 | United Kingdom . |
| 2082344 | 3/1982 | United Kingdom . |

Primary Examiner—Robert L. Richardson
Attorney, Agent, or Firm—Sughrue, Mion, Zinn, Macpeak & Seas

[57] ABSTRACT

An optical head wherein a required astigmatism can be obtained readily to facilitate production thereof and the linear distance between a face of an information record medium and a light receiving element is reduced to reduce the overall size and weight of the optical head. The optical head comprises a prism having a parallelogram shape in side elevation. The prism has a reflecting/transmitting face extending at an angle of about 45 degrees with respect to an optical axis to the information record face for reflecting light from a light source toward the information record face, first and second reflecting faces extending perpendicularly to the optical axis for successively reflecting light transmitted thereto through the transmitting face, and a transmission face extending in parallel to the reflecting/transmitting face. Light emerging from the transmitting face of the prism is received and converted into an electrical signal by a light receiving element.

9 Claims, 2 Drawing Sheets

OPTICAL HEAD HAVING A PRISM

BACKGROUND OF THE INVENTION

1. Field of the Invention

This invention relates to improvements in an optical head wherein a beam of light from a light source is focused and irradiated upon an information record face of an optical disk or the like and reflected light from the information record face is received by a light receiving element to read information of the information record face.

2. Description of the Prior Art

An exemplary one of conventional optical heads of the type mentioned is first described with reference to FIG. 5. The optical head shown includes a light source 1 such as a semiconductor laser emitting element, a collimator lens 2 for collimating light from the light source 1 into substantially parallel light, a separating element 3 such as a half mirror or a polarizing separating membrane for reflecting light from the light source 1 but transmitting reflected light from an information record medium 5 such as an optical disk, an objective lens 4 for focusing light reflected by the separating element 3 upon a face of the information record medium 5, a cylindrical lens 6 having a focusing function only in one direction, and a light receiving element 7 for receiving light focused by the cylindrical lens 6 and converting the received light into an electric signal.

In the optical head, light emitted from the light source 1 is substantially collimated by the collimator lens 2, then reflected by the separating element 3, and then focused into a dot upon an information record face of the information record medium 5 by the objective lens 4. Then, the light reflected by the information record face passes through the objective lens 4 to make substantially parallel light, and then passes through the separating element 3, whereafter it passes through the cylindrical lens 6 so that it is focuses into a linear beam of light on a light receiving face of the light receiving element 7.

The light receiving face of the light receiving element 7 is divided into such four sectoral sections as shown in FIG. 6. Thus, if light irradiated upon the information record face of the information record medium 5 comes out of a focused condition or the focus thereof is displaced radially outwardly in a direction, then the amounts of light received at the four light receiving sections will be different from each other. Making use of this fact, a focusing servo signal and/or a tracking servo signal are obtained.

With the optical head having such a construction as described above, the cylindrical lens 6 having a cylindrical surface is necessitated. However, it is disadvantageous that an operation of polishing a face of the lens into a cylindrical face is cumbersome, and upon assembly, adjustment for establishing alignment between the center and an optical axis of the lens with each other is required.

An astigmatism generating device for eliminating such drawbacks as described above is disclosed in Japanese Utility Model Laid-Open No. 63-58316. Astigmatisim is a focus defect in which electrons in different axial planes come to focus at different points.

The astigmatism generating device is constituted such that a separating element in the form of a prism which corresponds to the separating prism 3 described above has, in addition to a reflecting/transmitting face which reflects light from a light source but transmits reflected light from an information record face of an information record medium, a reflecting face for reflecting such reflected light from the information record face, and the angle of the reflecting face is inclined with respect to the reflecting/transmitting face such that the astigmatism may be reduced to zero.

With the astigmatism generating device, since an astigmatism is generated due to the angle between the reflecting/transmitting face and the reflecting face of the separating element, if the angle is set in error, then the astigmatism will be erroneous, and a necessary image will not be obtained on a light receiving element.

Further, since the linear distance from the information record face of the information record medium to the light receiving element is not reduced, it is disadvantageous that the optical head cannot be reduced in overall size nor in overall weight.

SUMMARY OF THE INVENTION

It is an object of the present invention to provide an optical head wherein a required astigmatism can be obtained readily to facilitate production thereof.

It is another object of the present invention to provide an optical head wherein the linear distance between an information record face of an information record medium and a light receiving element is reduced to reduce the overall size and weight of the optical head.

In order to attain the above objects, according to the present invention, there is provided an optical head which comprises a light source, an objective lens for projecting light from the light source along an optical axis to an information record face of an information record medium and for receiving light reflected from the information record face, a prism having a reflecting/transmitting face extending at an angle of about 45 degrees with respect to the optical axis for reflecting light from the light source toward the objecting lens but transmitting therethrough light reflected from the information record face and transmitted thereto by way of the objective lens, a first reflecting face extending substantially at the right angle with respect to the optical axis for reflecting light transmitted thereto through the transmitting face, a second reflecting face extending substantially in parallel to the first reflecting face for reflecting light reflected from the first reflecting face, and a transmitting face extending substantially in parallel to the reflecting/transmitting face for transmitting therethrough light reflected from the second reflecting face, and a light receiving element for receiving light transmitted thereto through the transmitting face of the prism.

With the optical head, there is no need of employing such a cylindrical lens which is difficult to produce or a separating element such as a prism which has two faces with which the astigmatism of the optical head is reduced to zero as in a conventional optical head. Also assembly and adjustment of the optical head are facilitated.

In addition, since light is reflected by two reflecting faces within the prism, the distance from the objective lens to the light receiving element can be reduced as much, and consequently, the optical head can be reduced in overall size and weight.

The above and other objects, features and advantages of the present invention will become apparent from the

DESCRIPTION OF THE PREFERRED EMBODIMENT

Figure 1:
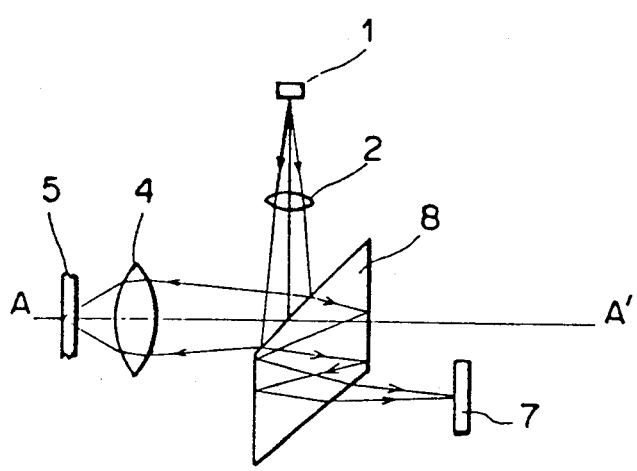
FIG. 1 is a diagrammatic representation of an optical head showing a preferred embodiment of the present invention.

Referring first to FIG. 1, there is shown in diagrammatic representation an optical head to which the present invention is applied. The optical head shown includes a light source 1 such as a semiconductor laser emitting element, a collimator lens 2 for collimating light from the light source 1 into substantially parallel light, a prism 8 for reflecting light from the light source 1 but transmitting reflected light from an information record medium 5 such as an optical disk, an objective lens 4 for focusing light reflected by the prism 8 upon a face of the information record medium 5, and a light receiving element 7 for receiving light from the prism 8 and converting the received light into an electric signal.

Figure 2:
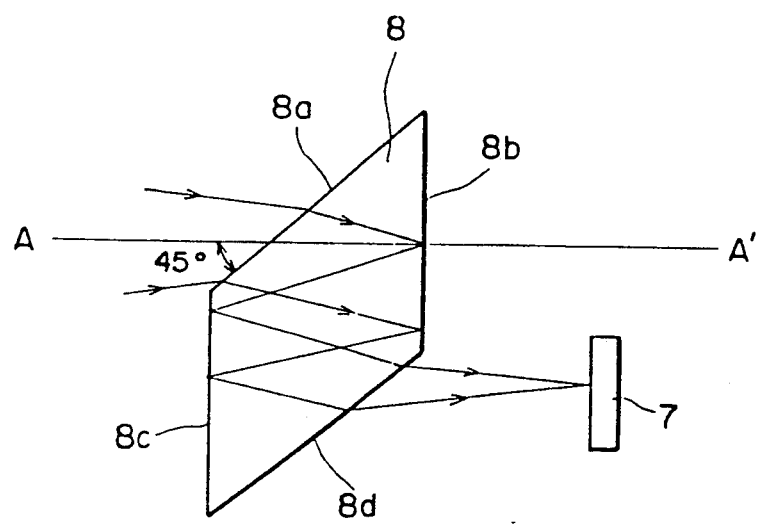
FIG. 2 is an enlarged view showing a prism of the optical head shown in FIG. 1.

Referring also to FIG. 2, the prism 8 has a substantially parallelogram shape in side elevation and has a reflecting/transmitting face 8a which extends at an angle of about 45 degrees with respect to an optical axis A—A' of the objective lens 4 perpendicular to the information record face of the information record medium 5 and thus has a function similar to that of the separating element 3 described above. The prism 8 further has a first reflecting face 8b substantially perpendicular to the optical axis A—A' for reflecting light reflected by the information record face of the information record medium 5 and transmitted thereto through the reflecting/transmitting face 8a, a second reflecting face 8c parallel to the first reflecting face 8b for reflecting light reflected from the first reflecting face 8b, and a transmitting face 8d substantially parallel to the reflecting/transmitting face 8a for transmitting light reflected from the second reflecting face 8c.

With the optical head, light emitted from the light source 1 is collimated by the collimator lens 2, reflected by the reflecting/transmitting face 8a of the prism 8, and focused to a limit of refraction upon the information record face of the information record medium 5 by the objective lens 4.

The light focused upon and introduced to the information record face of the information record medium 5 is reflected in accordance with information of the information record face and then passes through the objective lens 4 so that it is introduced into the reflecting/transmitting face 8a of the prism 8.

The light thus passes through the reflecting/transmitting face 8a and is then reflected toward the second reflecting face 8c by the first reflecting face 8b, whereafter it is reflected again by the second reflecting face 8c and then emerges from the transmitting face 8d to the light receiving element 7.

The light receiving element 7 thus converts an information signal of the reflected light into an electric signal. Consequently, optical signals on the information record medium 5 are extracted as corresponding electric signals.

Glass having an index of refraction of, for example, n = 1.51 may be used as a material for the prism 8. FIG. 2 illustrates a condition of beams of light with the prism 8 wherein the angle of the reflecting/transmitting face 8a with respect to the optical axis A—A' is 45 degrees, those of the first and second reflecting faces 8b and 8c are 90 degrees, and that of the transmitting face 8d is 41.2 degrees. Meanwhile, distributions of beams of light on the light receiving element 7 are illustrated in FIGS. 3A, 3B and 3C.

Figures 3A, 3B, 3C:
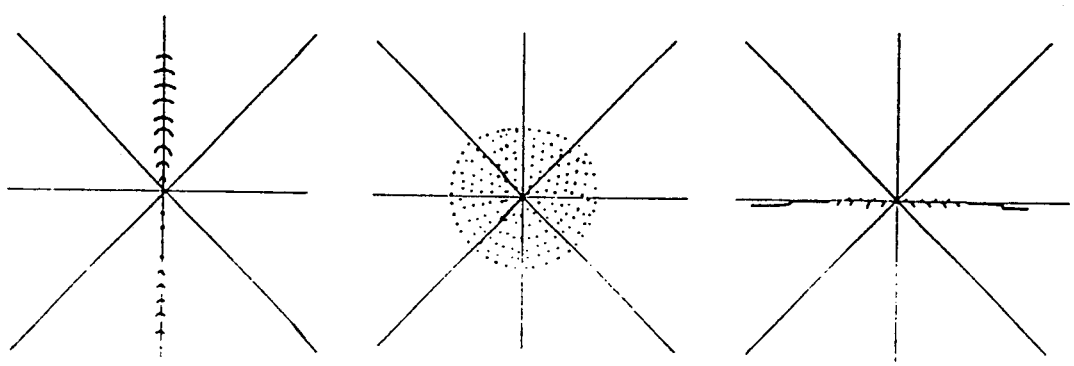
FIGS. 3A, 3B and 3C are diagrammatic illustrations showing different manners of reception of light by a light receiving element.

In particular, the prism 8 provides an astigmatism when a beam of light passes through the reflecting/transmitting face 8a and also through the transmitting face 8d, and in case the light is focused upon and presents a minimum diameter at the information record face of the information record medium 5, such a pattern having a small distortion as shown in FIG. 3B is obtained.

On the other hand, where the objective lens 4 is positioned excessively near to or far from the information record face of the information record medium 5 with respect to the focus point of the objective lens, a pattern will be elongated vertically or horizontally as shown in FIG. 3A or FIG. 3C. Accordingly, a signal for focusing servo can be obtained in accordance with a difference in output among individual light receiving sections of the light receiving element 7.

While the first and second reflecting face 8b and 8c of the prism 8 in the embodiment described above make parallel faces perpendicular to the optical axis A—A', the position of the focus on the light receiving element 7, the amount of astigmatism and the distortion can be controlled by modifying the prism 8 such that the faces 8b and 8c are inclined a little with respect to the perpendicular line of the optical axis A—A'.

The same effect can be attained similarly even with another modification of the prism 8 wherein the reflecting/transmitting face 8a and the transmitting face 8d are inclined a little from the individual positions thereof shown in FIG. 2.

Further, while the light receiving face of the light receiving element 7 of the optical head of the embodiment described above lies in a plane perpendicular to the optical axis A-A', a distortion in shape of a beam of light on the light receiving face can be removed by disposing the light receiving element 7 such that the light receiving face thereof is inclined a little with respect to the optical axis A—A'.

Figure 4:
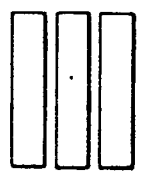
FIG. 4 is a diagrammatic representation illustrating a different manner of division of a light emitting face of a light receiving element.
Figure 5:
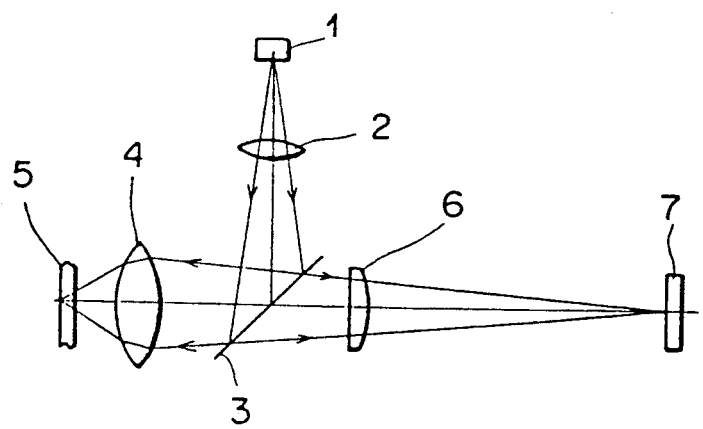
FIG. 5 is a diagrammatic representation of a conventional optical head.
Figure 6:
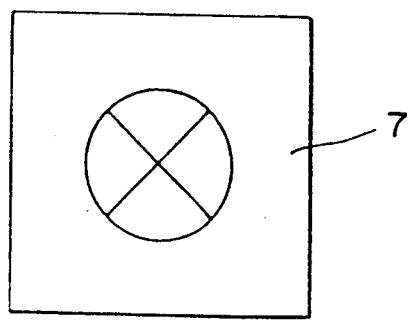
FIG. 6 is a front elevational view of a light receiving element of the optical head shown in FIG. 5.

In addition, it is also possible to divide a received light pattern on the light receiving element 7 into tablet-shaped sections, and this is shown in FIG. 4. A focusing error signal can be obtained from the modified light receiving element 7 where the tablet-shaped sections are arranged at at an angle of 45 degrees.

Having now fully described the invention, it will be apparent to one of ordinary skill in the art that many changes and modifications can be made thereto without departing from the spirit and scope of the invention as set forth herein.

What is claimed is:

1. An optical head, comprising a light source, an objective lens for projecting light from said light source along an optical axis to an information record face of an information record medium and for receiving light reflected from the information record face, a prism having a reflecting/transmitting face extending at an angle of about 45 degrees with respect to the optical axis for reflecting light from said light source toward said objecting lens but transmitting therethrough light reflected from the information record face and transmitted thereto by way of said objective lens, said prism further having a first reflecting face extending substantially at the right angle with respect to the optical axis for reflecting light transmitted thereto through said transmitting face and a second reflecting face extending substantially in parallel to said first reflecting face for reflecting light reflected from said first reflecting face, said prism further having a transmitting face extending substantially in parallel to said reflecting/transmitting face for transmitting therethrough light reflected from said second reflecting face, and a light receiving element for receiving light transmitted thereto through said transmitting face of said prism.

2. An optical head as claimed in claim 1, wherein said transmitting face of said prism is inclined at an angle equal to or a little smaller than the angle of said reflecting/transmitting face with respect to the optical axis.

3. An optical head as claimed in claim 1, wherein said first and second reflecting faces of said prism are inclined a little from a plane perpendicular to the optical axis.

4. An optical head as claimed in claim 1, wherein said reflecting/transmitting face and said transmitting face of said prism are inclined a little with respect to a plane which makes an angle of about 45 degrees with respect to the optical axis.

5. An optical head as claimed in claim 1, wherein said light receiving element has a light receiving face which either lies in or is inclined a little with respect to a plane perpendicular to the optical axis.

6. An optical head comprising:
a prism in optical communication with a light source;
an objective lens, receiving light generated from said light source and conveyed by a first transmitting face of said prism;
a light receiving element, receiving light initially passed by said objective lens and reflected from an optical medium; and
wherein said prism has a first reflecting face substantially perpendicular to a light path between said objective lens and said first transmitting face, a second reflecting face substantially parallel to said first reflecting face, and a second transmitting face substantially parallel to said first transmitting face.

7. The optical head recited in claim 6, wherein said prism is a parallelogram.

8. The optical head recited in claim 6, wherein said first reflecting face reflects light reflected by an information record face of said medium and transmitted by said first transmitting face, said second reflecting face reflects light reflected from said first reflecting face, and said second transmitting face transmits light reflected from said second reflecting face.

9. The optical head recited in claim 8, wherein an amount of astigmatism and distortion is controlled by modifying said prism such that said first and second reflective faces are inclined with respect to a plane perpendicular to said light path between said first transmitting face and said objective lens.

* * * * *

UNITED STATES PATENT AND TRADEMARK OFFICE
CERTIFICATE OF CORRECTION

PATENT NO. : 5,124,970

DATED : June 23, 1992

INVENTOR(S) : Katsuharu SATO et al.

It is certified that error appears in the above-identified patent and that said Letters Patent is hereby corrected as shown below:

Column 5, claim 1, lines 8 and 9, change "objecting" to --objective--;
line 15, change "transmitting face" to --reflecting/transmitting face--.

Signed and Sealed this

Twenty-first Day of September, 1993

Attest:

BRUCE LEHMAN

Attesting Officer

Commissioner of Patents and Trademarks